J. HUY.

Pile-Driver.

No. 9,057. Reissued Jan. 27, 1880.

WITNESSES:

W. W. Hollingsworth

Amos W. Hart

INVENTOR:

Jacob Huy

BY

ATTORNEYS.

N. PETERS, PHOTO-LITHOGRAPHER, WASHINGTON, D. C.

UNITED STATES PATENT OFFICE.

JACOB HUY, OF WHISTLER, ALABAMA.

PILE-DRIVER.

SPECIFICATION forming part of Reissued Letters Patent No. 9,057, dated January 27, 1880.

Original No. 109,623, dated November 29, 1870. Application for Reissue filed October 29, 1879.

*To all whom it may concern:*

Be it known that I, JACOB HUY, of Whistler, in the county of Mobile and State of Alabama, have invented a new and Improved Machine for Driving Piles; and I do hereby declare that the following is a full, clear, and exact description of the same, reference being had to the accompanying drawings, forming part of this specification, in which—

Figure 1:
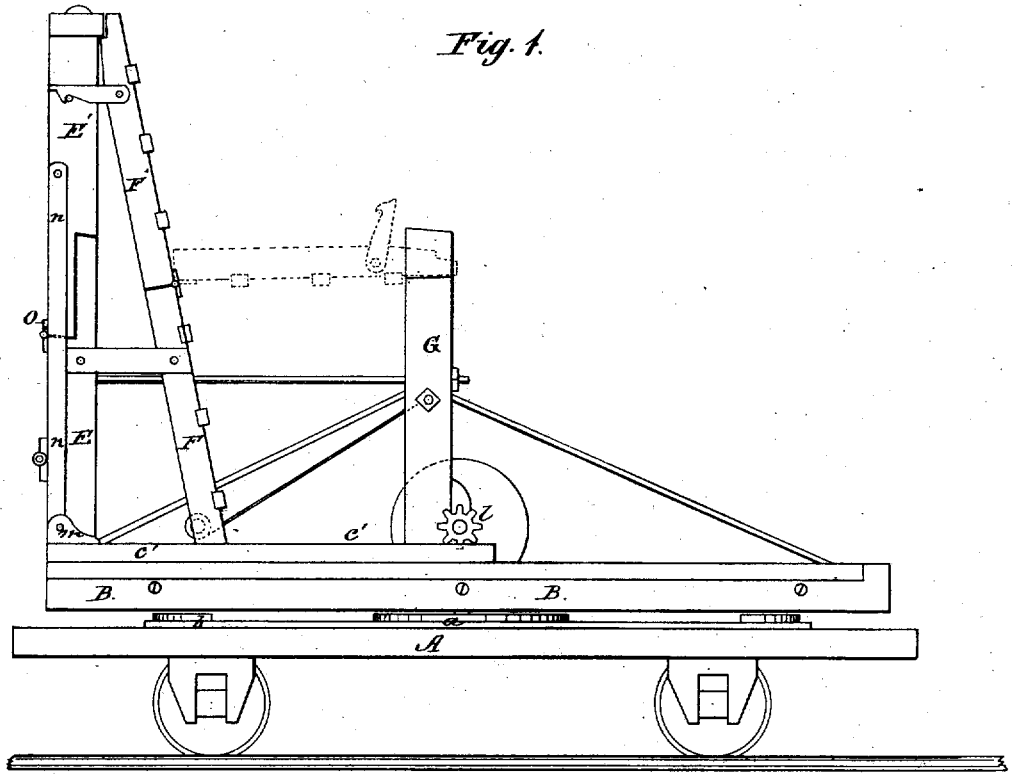
Figure 2:
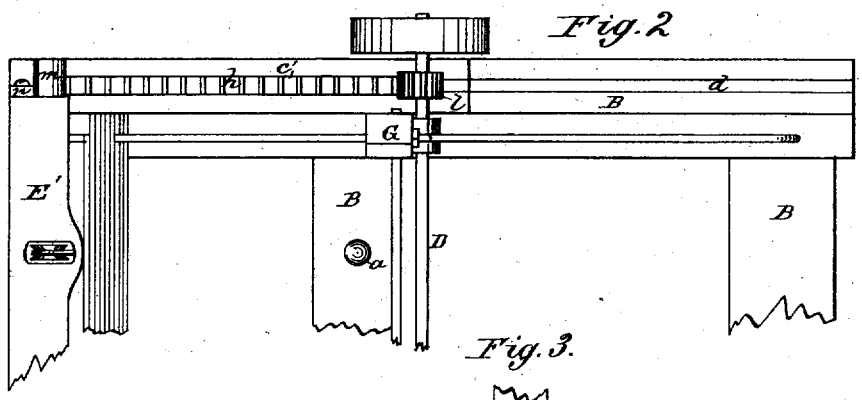
Figure 3:
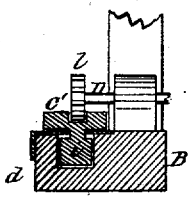

Figure 1 is a side elevation. Fig. 2 is a plan of one side; and Fig. 3 is a transverse vertical section, showing the groove in the side piece.

The invention relates to an improved pile-driver, which is mounted on the platform of a car adapted to run on rails.

The improvement consists, chiefly, in constructing the guides or vertical frame in sections, which are hinged together so that the upper portion may be conveniently lowered when required.

The invention also consists in providing such sectional guide-frame with a sectional brace, which is also hinged to adapt the upper section to fold like the guide-frame.

The invention also consists in the construction and arrangement of other parts, as hereinafter described and claimed.

In the drawings, A is an ordinary platform railway-car. B is a rectangular frame, pivoted centrally at the point *a* to the car A, and rotatable in a horizontal frame. *b* is a curved iron bar or rail, that is attached to the upper side of the car A near its front and rear end, and that extends entirely across said car, on which rail the frame B rests, the frame being provided with suitable rollers, which roll along the bar as the frame rotates on its pivot. This arrangement admits of turning the frame in any direction required for the accomplishment of its work, so that several piles may be driven without changing the location of the car.

In the upper surfaces of the side pieces of the frame B grooves *d* are cut, running the whole length of the side pieces. *c'* is an iron carriage, from the under side of which ribs *i* project downward and enter said grooves.

On the upper sides of the carriage *c'* are formed cogs *h*, or the cogs may be made separate from the carriages and bolted to them.

D is a shaft mounted transversely of the frame B, and bearing toothed wheels *l*, which engage with the cogs of the carriage *c'*.

Motion is intended to be communicated to the shaft D in any suitable manner—say from a steam-engine placed upon the car A, and which, if desired, may be connected with the car-wheels, in order that both the car and the pile-driving machinery may be driven by the same engine.

The rotation of the shaft D moves the carriage *c'* either forward or backward in the ways along the sills.

The frame in which the pile-driving hammer (not shown) is guided consists of the fixed part E, fixed on the front of frame B, and the section E', which are hinged together at *o*, and have their contiguous ends cut away to form a square scarf-joint. This manner of constructing the guide-frame allows the part E' to be lowered upon the fixed part E when required for any purpose—as, for example, so that the car A and its attachment may pass through tunnels, under bridges, &c.

When the folding section E' is elevated, or in its normal position, as shown in Fig. 1, it is braced by an inclined ladder, which is composed of the fixed part F and hinged upper section, F'. The latter is supported partly on the posts G when lowered, as shown by dotted lines, Fig. 1. The bars *n* serve as supports or stays for the guide-frame section E' when the latter is in vertical position. Said bars are jointed to blocks *m* on the front end of carriage *c'*, and their upper ends are pivoted to folding section E'.

The shaft D may be utilized for raising and lowering the guide-frame section E', since the rotation of the former will move the carriage *c'* backward on frame B, and thus cause the section E' to turn forward on joint *o*. In such case the bars *n* serve as receding or moving supports for said section while being lowered, since the bars move with the carriage *c'*, instead of remaining stationary like the lower section, E, of the guide-frame.

What I claim is—

1. The guide-frame of the pile-driver, made in sections, which are hinged together to adapt a portion thereof to be folded or lowered, substantially as shown and described.

2. The combination of the fixed guide-frame section E and folding section E′, hinged together at *o*, with a movable platform, A, as shown and described.

3. The combination of the sectional and folding guide-frame E E′ and the sectional folding brace F F′, as shown and described.

4. The combination of the grooved sills and toothed carriage *c′*, sliding therein, the shaft D, provided with cog-wheels *l*, gearing with the rack *h* of the carriage, connecting-rods *n*, and frame E, made in sections, which are hinged together, substantially as and for the purpose specified.

JACOB HUY.

Witnesses:
J. E. WORTHMAN,
E. S. MARSHALL.